United States Patent [19]

Rice, Jr.

[11] 4,015,345
[45] Apr. 5, 1977

[54] MULTIPLICATION LEARNING AID DEVICE

[76] Inventor: Howard E. Rice, Jr., 2684 Deming Blvd., Cheyenne, Wyo. 82001

[22] Filed: Dec. 17, 1975

[21] Appl. No.: 641,518

[52] U.S. Cl. ................................................ 35/31 E
[51] Int. Cl.² ........................................ G09B 19/02
[58] Field of Search .............. 35/31 R, 31 B, 31 C, 35/31 D, 31 E, 9 E, 9 F

[56] References Cited
UNITED STATES PATENTS

| 898,587 | 9/1908 | Matthias | 35/31 D |
| 3,253,358 | 5/1966 | Wright | 35/9 E UX |
| 3,432,943 | 3/1969 | Merkel | 35/31 E |

Primary Examiner—William H. Grieb
Attorney, Agent, or Firm—Marden S. Gordon

[57] ABSTRACT

A device designed to be used in elementary school classrooms in conjunction with an overhead projector to teach and enforce the concept of multiplication to students, the device having a square board with a vertical row of encircled numbers along one edge and a horizontal row of encircled numbers along the top edge with a series of colored circles covering the board with one circle provided at each point on the board where a vertical number and a horizontal number intersect, the device being further provided with an insert slidable in and out of the bottom of the board to protect the board when not in use, two inserts toward the top of the device to cover the numbered board which can be moved in or out of the board to progressively uncover or cover either the vertical and/or horizontal rows of circles, so that the inserts can be moved to display combinations of different numbers on a screen or suitable surface by means of an overhead projector to visually teach students the multiplication table.

1 Claim, 3 Drawing Figures

U.S. Patent  April 5, 1977  4,015,345
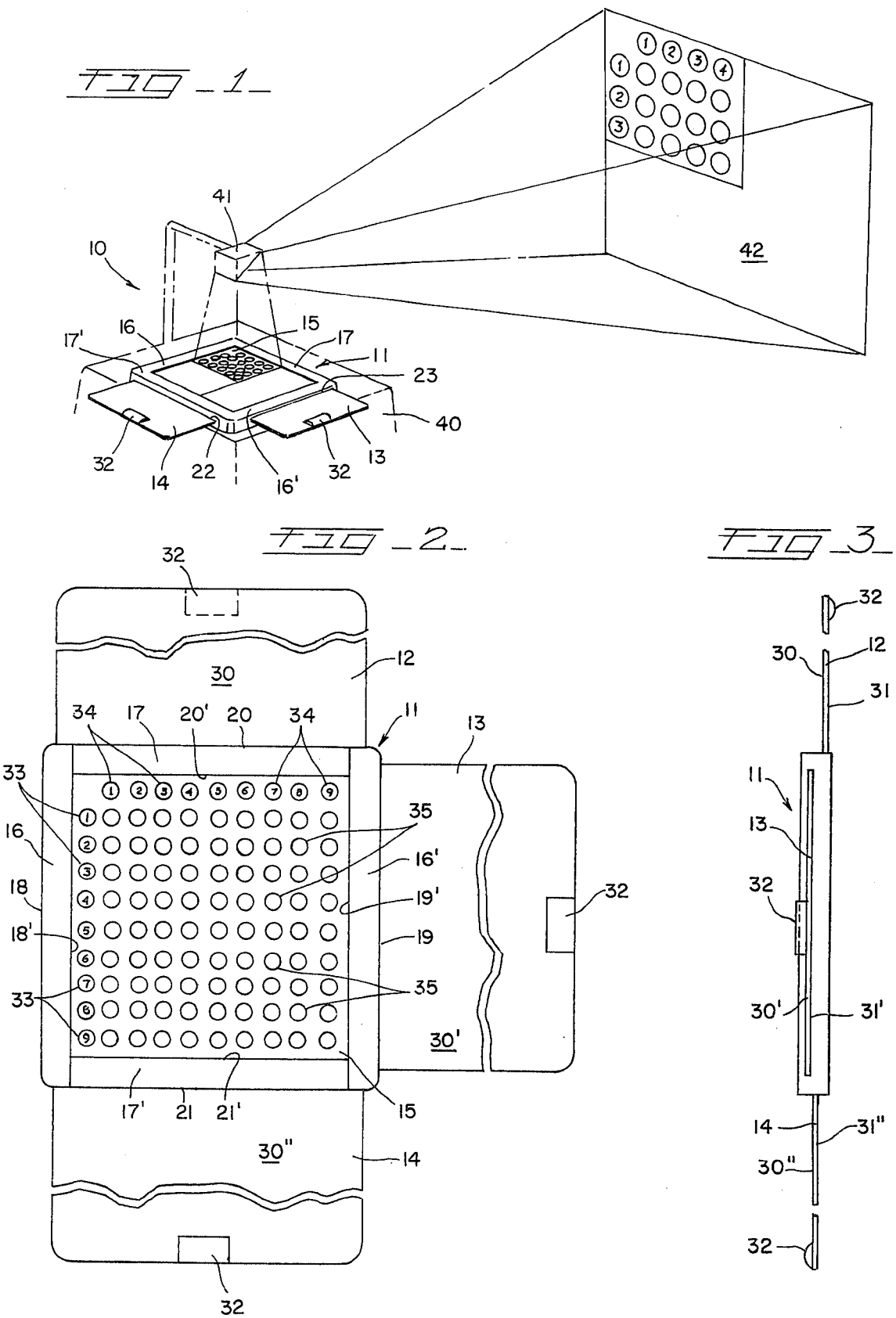

MULTIPLICATION LEARNING AID DEVICE

BACKGROUND OF THE INVENTION

1. Field of the Invention

This invention relates to a multiplication learning aid device for visually teaching and enforcing the multiplication tables in elementary school classrooms.

2. Description of the Prior Art

Teachers and educators have devised and tested many methods and techniques for teaching multiplication tables to elementary school students. Examples include typed or printed sheets of the multiplication tables, display cards with the equation printed on one side and the answer on the opposite side, and teaching methods a illustrated in recent text books often referred to as "modern math," such techniques being generally tedious and boring to the student so that mental enforcement of the multiplication tables is usually accomplished only after long and continuous use of the multiplication tables after progressing to more difficult problems thereby resulting in a slow and gradual understanding of the multiplication process. Accordingly, there is a obvious need for a simple training device that will teach elementary school students the multiplication tables in an expeditious manner and, at the same time, providing a thorough appreciation and understanding of the multiplication process.

SUMMARY OF THE INVENTION

The present invention provides a novel multiplication learning aid device for teaching the multiplication tables to elementary school students with the use of a visual aid to provide an appreciation and understanding of the multiplication process.

It is a feature of the present invention to provide a multiplication learning aid device.

A further feature of the present invention provides a multiplication learning aid device which is easy to use by teachers in instructing students the multiplication tables and in explaining the multiplication process.

Yet still a further feature of the present invention provides a multiplication learning aid device which will enhance the interest and stimulate a student's understanding in learning the multilplication tables.

Other features of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the multiplication learning aid device as used with an overhead projector; and FIG. 2 is a top view of the multiplication learning aid device with the inserts in an extended open position; and FIG. 3 is a side view of the multiplication learning aid device.

DESCRIPTION OF THE PREFERRED EMBODIMENT

Referring now to the drawings in detail, there is illustrated a preferred form of the multiplication learning aid device constructed in accordance with the principles of the present invention and which is designated generally in its entirety by the reference numeral 10 and which is comprised of a frame 11, a bottom insert 12, a vertical insert 13, a horizontal insert 14, a multiplication display board 15, and associated components and configurations as will be later described.

The frame 11 is constructed of durable material, such as plastic or wood, and is rectangular or nearly square in configuration, consisting of two vertical frame members 16 and 16', two horizontal frame members 17 and 17', with the vertical frame member 16 having an external side wall 18 and an internal side wall 18', the vertical frame member 16' having an external side wall 19 and an internal side wall 19', the horizontal frame member 17 having an external side wall 20 and an internal side wall 20', and the horizontal frame member 17' having an external side wall 21 and an internal side wall 21'. An elongated slotted hole (not shown) is provided near the bottom of the external side wall 20, with the slotted hole extending through the horizontal frame member 17 and the internal side wall 20' to match slots (also not shown) milled into the sides of the internal side walls 18' and 19' of the vertical frame members 16 and 16' to provide easy sliding of the bottom insert 12 into or out of the slot. The external side wall 21 of the horizontal frame member 17' is provided with an elongated slotted hole 22 extending through the horizontal frame member 17' through the internal side wall 21' to match slots (not shown) provided in the vertical frame members 16 and 16' along their internal side walls 18' and 19' for easy sliding of the horizontal insert 14 in or out of said slot, the slot for the horizontal insert 14 being provided toward the top of the frame 11 and above the slot for the bottom insert 12. An elongated slotted hole 23 is provided on the external side wall 19 of the vertical frame member 16' and extends through the internal side wall 19' to match slots (not shown) provided along the internal side walls 20' and 21' of the horizontal frame members 17 and 17' for easy sliding of the vertical insert 13 in or out thereof, with the slots being provided in the frame 11 above the slots provided for insertion of the bottom insert and the horizontal insert 14.

The bottom insert 12, the vertical insert 13, and the horizontal insert 14 are of similar or identical construction and are made out of durable material, such as wood or plastic, each having a top surface 30, 30', and 30" respectively, a bottom surface 31, 31', and 31" respectively, with the width of the top and bottom surfaces matching the length of the elongated slotted holes 22 and 23 to provide easy insertion of the bottom insert 12, the vertical insert 13, and the horizontal insert 14 in and out of the frame 11. A finger grip 32 is provided centrally along the width and placed on the outside edge of the bottom surface 31 of the bottom insert 12, on the top surface 30' of the vertical insert 13, and on the top surface 30" of the horizontal insert 14.

The multiplication display board 15 is constructed of durable material, such as wood or plastic, and is rectangular or nearly square in configuration to match the dimensions provided by the internal side walls 18', 19', 20', and 21'. The multiplication display board 15 is provided with a series of vertical holes 33 and a series of horizontal holes 34 which are covered with transparent material with the numbers 1 through 9 opaquely provided centrally thereon, the numbers 1 through 9 progressing from top to bottom along the vertical holes 33 and from left to right along the horizontal holes 34.

A series of round through holes 35 are provided on the multiplication display board 15 to match the intersections of the vertical holes 33 and the horizontal holes 34, the holes 35 being covered by a colored transparent or translucent material, such as red thin plastic.

In operation, the teacher places the multiplication learning aid device 10 on a viewing table 40 as shown in FIG. 1 for projection of the numbers in the vertical holes 33 and the horizontal holes 34 through the overhead projector 41 onto the screen or suitable surface 42. The bottom insert 12 is completely removed from the frame 11 before using and is placed back into the frame 11 to protect the multiplication display board 15 after use. The teacher then poses a multiplication problem to the students, such as 4 × 3 as shown in FIG. 1, and slides the vertical insert 13 and the horizontal insert 14 out of the frame 11 to uncover the multiplicand and the multiplier respectively. The students can then answer the question and check their answers by counting the number of colored dots provided by display of the colored round through holes 35 on the display screen or surface. The vertical insert 13 and the horizontal insert 14 can be slid out of the frame 11 to uncover any combination of two numbers to be multiplied, up to 9 × 9.

There is thus provided a novel multiplication learning aid device which provides an effective visual aid for teaching the multiplication tables to elementary school students to enable the students to visualize how numbers expand during the multiplication process, thereby reinforcing the concept of multiplication within the students minds for a better understanding and easier retention of the multiplication tables.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention.

Having thus described the invention, what is claimed is:

1. A multiplication learning aid device for teaching multiplication tables and mentally reinforcing the concepts of multiplication to elementary school students, the device comprising, in combination:
   a framework containing a multiplication display board provided with vertical and horizontal rows for transparent or translucent display of the numbers 1 through 9;
   a series of translucent colored holes covered with colored translucent material with one each of the holes provided at each of the respective intersecting points of each of the numbers;
   a bottom insert slidable into the framework to protect the device when not in use, and removable from the framework when in use;
   vertical and horizontal inserts used to cover or uncover a combination of horizontal and vertical numbers with their corresponding number of colored holes to visually display the product result of a multiplicand and multiplier; and
   the numbers and the series of colored holes for use in combination with an overhead projector to visually display the multiplication tables to elementary school students on a screen for use as a visual aid.

* * * * *